A. G. McADIE.
FRUIT PROTECTOR.
APPLICATION FILED OCT. 9, 1911.
1,021,691.
Patented Mar. 26, 1912.
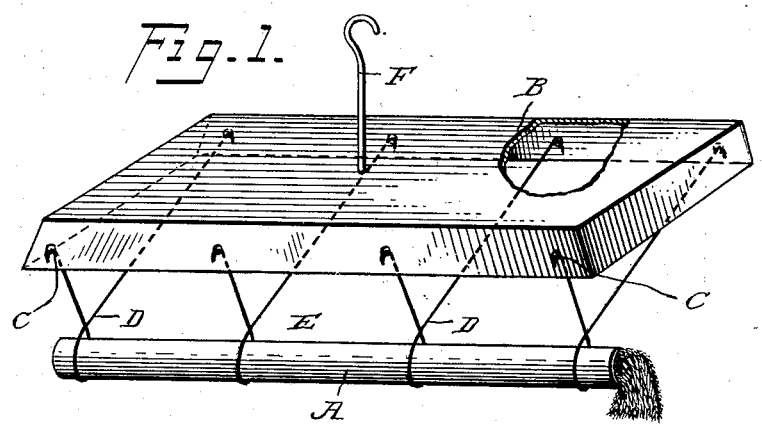
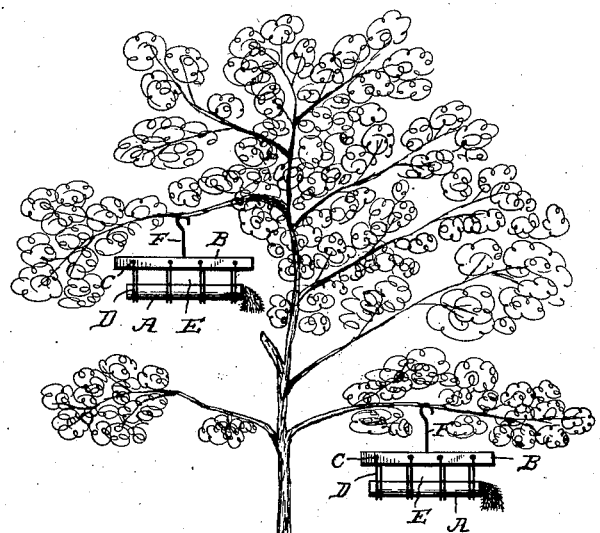
WITNESSES
Hermann E. Hobbs.
Harry L. Ames.
INVENTOR
Alexander G. McAdie
By Geo. McCabe
Attorney

UNITED STATES PATENT OFFICE.

ALEXANDER G. McADIE, OF SAN FRANCISCO, CALIFORNIA.

FRUIT-PROTECTOR.

1,021,691.  Specification of Letters Patent.  Patented Mar. 26, 1912.

Application filed October 9, 1911. Serial No. 653,760.

(DEDICATED TO THE PUBLIC.)

*To all whom it may concern:*

Be it known that I, ALEXANDER G. MC-ADIE, an employee of the Department of Agriculture of the United States of America, residing at San Francisco, California, (whose post-office address is San Francisco, California,) have invented a new and useful Improvement in a Fruit-Protector.

This application is made under the act of March 3, 1883, chapter 143 (22 Stat., 625), and the invention herein described and claimed may be used by the Government of the United States or any of its officers or employees in the prosecution of work for the Government or any person in the United States, without payment to me of any royalty thereon.

My invention relates to a combustible candle, suspended a short distance below a metallic shield, and is intended to provide the necessary heat and so distribute it during periods of frost as to warm fruit in bud, blossom or setting, and thus prevent injury such as usually occurs to fruit by frost or low temperature.

The principle of my invention is to supply heat from a source which can be located near the fruit. The amount of heat must be neither too large nor too small; but sufficient to maintain with some uniformity a temperature slightly above the freezing point. It is also necessary to catch and prevent from settling on the leaves or fruit the dense smoke which results from the burning of crude oil, petroleum or other fuel. The carbon particles of the smoke are deposited chiefly upon the metallic shield which resembles an inverted pan. The shape of this shield is also favorable to the retention of hot air; and as at times of frost there is generally a quiet condition of atmosphere, little if any wind and a stagnant circulation of air, the metallic shield traps to some degree the rising heated air, which in turn communicates its heat to the metallic shield. The upper surface of the shield radiates heat to the fruit above. This is considered an important matter in the protection of fruit, as radiant heat is less apt to do injury to vegetable fiber in a tender state, than dry convectional heat, such as would be given by the heated air rising from the open flame, or by contact with the flame itself. By the aid of the shield the danger of scorching or singeing is reduced. The shield also minimizes the possibility of a tree being set on fire by the naked flame at the end of the candle.

The candle, or as I have sometimes called it in my experiments, the anti-frost cartridge, because of the fancied resemblance to a cartridge, consists of a cylindrical tube of cardboard or stiffened paper, open at one or both ends as may be desired. In my experiments I have found the ordinary mailing tube of card-board satisfactory. The tube is filled with cotton waste or other suitable material that will serve as wicking, and crude oil, distillate, or other combustible matter. Enough of the cotton waste is allowed to hang out at the ends to afford a ready means of lighting. When the candle is in place, resting as it does in a dire cradle under the inverted pan, it can readily be ignited by the use of a small flaming torch. The tube and its contents burn completely and there should be no residue except possibly small pieces of charred card-board, although under favorable conditions of combustion not even these should remain.

The purpose of the whole combination is to afford an available, inexpensive, easily handled and comparatively clean method of furnishing the desired amount of heat near the fruit and thus obtain a higher efficiency of the fuel used. There is no warming up of all-out-of-doors, as must be the case where open fires on the ground six or more feet away from the trees are used, or even where small fires or oil pots or orchard heaters or other devices placed on or near the ground are used.

The nature, characteristic features and scope of my invention will be more readily understood from the following description taken in connection with the accompanying drawing forming a part hereof:

Figure 1 is a perspective view of my invention, and Fig. 2 is a detailed view showing the invention in place.

Referring to the drawing, "A" represents a card-board tube such as is ordinarily used for mailing purposes. The tube may be of any size, from 1 foot to 2 feet and in diameter from 1 inch to 3 inches. The thickness of the card-board used may be about one-thirty-second of an inch. If preferred, Manila paper of a heavy quality and of sufficient stiffness may be employed instead of card-board. The tube is packed with twisted cotton waste or other suitable inflammable material and crude oil poured into the tube. If the cotton waste is properly packed at the lower end, there will be no leakage of oil. A cup or cover however can be used in process of filling to catch any oil that may leak. At the upper end a sufficient amount of the cotton waste or wicking is allowed to project so that the candle may be readily ignited.

B represents a metallic shield made of thin sheet metal, either iron or tin. For a small candle, i. e., one about 12 inches long, and 1½ inches in diameter, a sheet of metal 24 inches long by 16 inches wide is cut at each corner along diagonal lines about 4½ inches. The ends and sides are bent downward, the whole forming an inverted pan. The object of this hood, or shield, is first to prevent the flame from burning, scorching or singeing the fruit, leaves or branches. Second, to catch and retain the carbon particles of the smoke and prevent their deposition upon the fruit, leaves or branches. Third, to catch and retain a certain volume of heated air. Fourth, by becoming heated on the under side, to cause radiation of heat from the upper and outer surfaces. Small holes, C C, are punched in the shield near the rim and pieces of fine wire, D D, about 18 inches long hooked into these holes. Loops are twisted in those wires, thus forming the cradle, E, into which the candle is inserted. A wire hook F, is fastened to the top of the shield. By means of this hook, F, the whole combination can be easily fastened to the bough or branch of a tree in such position as to give the desired heating effect.

In practice the candles are filled and made ready for lighting during the afternoon hours and are placed in the cradles before dark. When the temperature falls to the freezing point, the candles are fired. The candles will burn for several hours and if the combustion is as complete as it should be, the candle is entirely consumed. The shield will continue to radiate heat for some time after the candle is consumed or extinguished. The whole combination is not of sufficient weight to injuriously affect the tree. During the winter months the shield can remain in place. After danger from frost has passed the shields can be stacked so as to occupy little room and put by for use next season.

Having thus described my invention I claim as follows:

1. A device of the kind described, comprising a shield, means for suspending said shield from a tree, a cartridge of combustible material adapted to radiate heat and means for suspending said cartridge beneath said shield.

2. A device of the kind described, comprising a shield, a hook arrangement for suspending said shield from a tree, a cartridge of combustible material adapted to radiate heat, said shield having a plurality of holes, a plurality of wire pieces engaging said holes and formed with loops in alinement with each other for suspending said cartridge beneath said shield.

3. A device of the kind described, comprising a shield formed in the shape of an inverted pan, a hook arrangement for suspending said shield from a tree, a cartridge of combustible material, said shield having a plurality of apertures, a plurality of wire pieces engaging said apertures and formed with loops in alinement with each other for suspending said cartridge beneath said shield, said cartridge adapted to burn slowly and transmit heat upwardly for heating said shield, said shield radiating heat from its surface for warming fruit during low temperatures, thereby preventing injury to fruit from frost, substantially as specified.

In testimony whereof I have signed this specification in the presence of two subscribing witnesses.

ALEXANDER G. McADIE.

Witnesses:
   WALTER H. SCHOLL,
   WILLIAM J. REED.

---

Copies of this patent may be obtained for five cents each, by addressing the "Commissioner of Patents, Washington, D. C."